United States Patent [19]

Kirschner

[11] Patent Number: 5,029,286
[45] Date of Patent: Jul. 2, 1991

[54] PULSE SHAPER FOR INDUCTIVE PICKUPS HAVING A VOLTAGE CONTROLLED DIFFERENTIAL VOLTAGE DIVIDER

[75] Inventor: Michael Kirschner, Pforzheim, Fed. Rep. of Germany

[73] Assignee: Robert Bosch GmbH, Stuttgart, Fed. Rep. of Germany

[21] Appl. No.: 343,259

[22] PCT Filed: Aug. 27, 1987

[86] PCT No.: PCT/DE87/00380
§ 371 Date: Apr. 12, 1989
§ 102(e) Date: Apr. 12, 1989

[87] PCT Pub. No.: WO88/04053
PCT Pub. Date: Jun. 2, 1988

[30] Foreign Application Priority Data

Nov. 22, 1986 [DE] Fed. Rep. of Germany ....... 3639947

[51] Int. Cl.$^5$ .......................... G01P 3/48; G01P 3/54; G01B 7/14
[52] U.S. Cl. ............................. 324/173; 324/207.12; 324/207.15; 324/207.25
[58] Field of Search ............... 324/207, 208, 225, 173, 324/174, 207.12, 207.13, 207.15, 207.16, 207.22, 207.24, 207.25; 336/75, 77, 79; 307/261, 268, 290; 328/13, 28, 31

[56] References Cited

U.S. PATENT DOCUMENTS 4,475,526 10/1984 Schleupon ......................... 123/414

FOREIGN PATENT DOCUMENTS 3226273 4/1983 Fed. Rep. of Germany .
2171777 9/1973 France .
8300193 1/1983 PCT Int'l Appl. .

OTHER PUBLICATIONS

Patent Abstracts of Japan, vol. 8, No. 139, (E-253) (1576), 6/1984 (JP 59-49014.

Primary Examiner—Walter E. Snow
Attorney, Agent, or Firm—Michael J. Striker

[57] ABSTRACT

A pulse shaper for inductive pickups, in particular for inductive speed pickups or angle of rotation pickups on internal-combustion engines, is proposed, which has a voltage controlled voltage divider (14, 17, 19) at its input. A level adaptation takes place of the signal delivered by the inductive pickup (10) to a Schmitt trigger stage (44), at the output (57) of which a voltage jump occurs whenever the signal delivered by the pickup (10) rises above a certain value and falls below a certain value. The voltage divider at the input of the pulse shaper is formed by a resistor (14) and a first and second diode (17, 19), the differential resistance of which can be set by controlled voltage sources (24, 28). The special advantage of the circuit is that no higher voltage than the operating voltage of the pulse shaper can occur after the resistor 14 at the input. The pulse shaper is ideally suited for integration, as only easily integratable components are contained in the circuit.

17 Claims, 1 Drawing Sheet

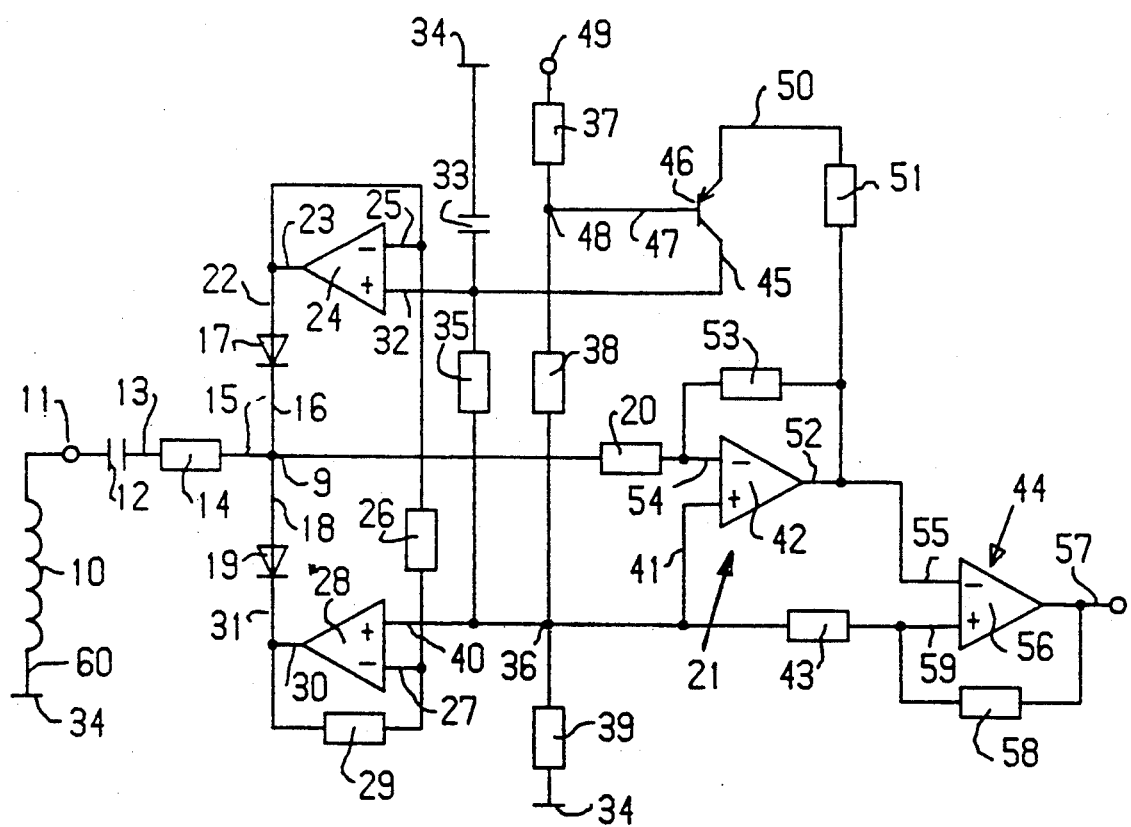

PULSE SHAPER FOR INDUCTIVE PICKUPS HAVING A VOLTAGE CONTROLLED DIFFERENTIAL VOLTAGE DIVIDER

PRIOR ART

The invention is based on a pulse shaper for inductive pickups particularly for speed pickups or angle of rotation pickups at internal combustion engines.

A device for the generation of a speed-dependent signal sequence from the periodic voltage of an inductive pickup arrangement for angle of rotation sensing on an internal-combustion engine is known from German Patent Specification No. 3,127,220. The pickup voltage is fed to a threshold stage. To reduce the self-adjustment, means are provided which shift the pickup voltage for feeding to the threshold stage amplitude-dependently in such a way that the switching point of the threshold stage is fixed as a function of the angle of rotation. The amplitude shift is divided into a negative and positive amplitude shift. For both shift components, integration capacitors are provided which are reconnected to the pickup via diodes. Connected in parallel to the capacitors are resistors which serve to set a defined discharge of the integration capacitors.

It is disadvantageous in the case of the device known from German Patent Specification No. 3,127,220 that the inductive pickup has to be capable of providing the charging currents for the integration capacitors. The necessary currents are additionally increased by the resistors connected in parallel with the integration capacitors. A further disadvantage is that the diodes and the integration capacitors are subjected to high voltages, which may amount to several 100 volts, if the inductive pickup is a speed pickup on an internal-combustion engine which has to cover a large speed range. A high operating voltage, however, requires voluminous and expensive capacitors.

ADVANTAGES OF THE INVENTION

The pulse shaper acording to the invention allows, with a low expenditure on circuitry, an adaptation of a highly fluctuating input level to a predeterminable level and consequently a suppression of shifts over time of the pickup signal. In comparison with known pulse shapers, it has the advantage that the high voltage delivered by the inductive pickup only occurs at an ohmic resistor arranged at the input of the pulse shaper. The integration capacitor used in the pulse shaper and all other components of the pulse shaper are subject to no more than the operating voltage of the pulse shaper. The resistor at the input of the pulse shaper forms with diodes a voltage divider which has the special advantage that a change in the diode voltage makes possible a change in the voltage divider ratio. For this purpose, controlled voltage sources are provided which pick off their control signal from the integration capacitor. It is advantageous furthermore that the pickup only has to provide a low electric power output, since the previously necessary charging current of the integration capacitors is no longer needed. Consequently, the volume of the pickup can be reduced.

It is favourable if the controlled voltage source connected to the integration capacitor is designed with a differential amplifier wired as an impedance transformer and with a further differential amplifier wired as an inverting amplifier, the input signal of which is the output signal of the impedance transformer It is further of advantage that the pulse shaper according to the invention can be produced particularly easily as an integrated circuit, as only easily integratable components are involved. This embodiment entails a considerable cost reduction for series production in the automobile industry if the pulse shaper according to the invention is used as a speed or angle of rotation pickup on internal-combustion engines.

Further details and advantageous further developments of the pulse shaper according to the invention emerge from the following description.

DRAWING

The single figure shows a circuit diagram of a pulse shaper according to the invention.

DESCRIPTION OF THE EXEMPLARY EMBODIMENT

An inductive pickup 10, not described in more detail, is connected by its first terminal 11 via a capacitor 12 to a first terminal 13 of an ohmic resistor 14. A second terminal 60 of the inductive pickup 10 is connected to ground 34. A second terminal 15 of the resistor 14 is in connection with the cathode terminal 16 of a first diode 17 and an anode terminal 18 of a second diode 19 as well as with an input resistor 20 of an amplifier circuit arrangement 21.

The anode terminal 22 of the first diode 17 is at the output 23 of a first differential amplifier 24. The output 23 is connected to the inverting input 25 of the first differential amplifier 24. In addition, the output 23 is in connection via an input resistor 26 with the inverting input 27 of a second differential amplifier 28. Furthermore, at the inverting input 27 there is a negative feedback resistor 29, which leads to the output 30 of the second differential amplifier 28, which also connected to the cathode terminal 31 of the second diode 19.

At the non-inverting terminal 32 of the first differential amplifier 24 there is a capacitor 33, which is connected to ground 34. At the connection point of the capacitor 33 and the terminal 33 there is connected a discharging resistor 35, which lead to a tap 36 of a voltage divider consisting of three resistors 37, 38, 39. At the tap 36 there are additionally connected the non-inverting input 40 of the second differential amplifier 28, the non-inverting input 41 of a third differential amplifier 42, wired as an inverting amplifier, and an input resistor 43 of a Schmitt trigger stage 44.

The connection point of the capacitor 33 and the terminal 32 is further connected to the collector terminal 45 of a transistor 46. The base 47 of the transistor 46 is connected with a further tap 48 of the voltage divider consisting of the three resistors 37, 38, 39. This divider is connected between ground 34 and a terminal point 49 of an operating voltage source. The emitter terminal 50 of the transistor 46 is connected via a current-limiting resistor 51 to an output 52 of the third differential amplifier 42. The output 52 is connected via a negative feedback resistor 53 to the inverting input 54 of the third differential amplifier 42 and to the inverting input 55 of a fourth differential amplifier 56, wired as a Schmitt trigger state 44. The output 57 of the amplifier 56 at which the output signal of the pulse shaper can be taken, is in connection via a positive feedback resistor 58 with the non-inverting input 59 of the amplifier 56, to which the input resistor 43 is also connected.

The second terminal 60 of the inductive pickup 10 is advantageously connected to ground 34, because then a connecting lead from the pickup 10 to the pulse shaper is saved. If the second terminal 60 is connected to the tap 36 of the voltage divider 37, 38, 39, the capacitor 12 can be dispensed with.

The pulse shaper according to the invention operates as follows:

An alternating-current voltage signal delivered by the inductive pickup 10 passes via the first terminal 11 of the pickup 10 and via the capacitor 12 as well as via the resistor 14 to the input of the amplifier circuit arrangement 21. The amplifier circuit arrangement 21 amplifies the smallest still occurring pickup voltage to such an extent that the following Schmitt trigger stage 44 can still switch. The amplifier 21 is a differential amplifier 42 wired as an inverting amplifier. The amplification factor is determined in a known way by the ratio of the negative feedback resistor 53, which is connected between the output 52 and the inverting input 54 of the differential amplifier 42, and the value of the input resistor 20 connected to the inverting input 54.

The transistor 46 connected via the resistor 51 to the output 52 of the amplifier circuit arrangement 21 forms together with the voltage divider resistors 37, 38 a level detector. If, due to a higher pickup voltage, the output voltage at the output 52 of the amplifier circuit arrangement 21 is greater than the voltage at the tap 48 between the voltage divider resistors 37, 38 plus the base-emitter voltage of the transistor 46, the transistor 46 becomes conductive and the capacitor 33 connected to the collector terminal 45 of the transistor 46 is charged via the transistor 46 and the resistor 51.

The voltage at the capacitor 33 represents the control voltage of a controlled voltage source, which is realized as an impedance transformer by the completely negative feedback coupling of differential amplifier 24. The negative feedback is provided by the connection of the input 23 to the inverting output 25. The capacitor voltage is at the non-inverting input 32 of the differential amplifier 24. The differential amplifier 24 generates at its output 23 a voltage which is applied to the anode terminal 22 of the first diode 17.

The signal occurring at the output 23 of the differential amplifier 24 for controlling the voltage divider 14, 17 additionally serves as a control signal of a further controlled voltage source, which is realized by the differential amplifier 28 wired as an inverting amplifier. The output signal of the first differential amplifier 24 passes via the input resistor 26 to the inverting input 27 of the second differential amplifier 28, which has the negative feedback resistor 29 connected between its output 30 and the inverting input 27. The amplification is determined in a known way by the ratio of the negative feedback resistor 29 and of the input resistor 26.

The output 30 of the second differential amplifier 28 determines the voltage at the cathode terminal 31 of the second diode 19.

The two diodes 17, 19 and the resistor 14 represent a voltage divider with the centre tap 9. An effect is brought to bear by the ohmic resistance of the resistor 14 and by the differential resistance of the two diodes 17 and 19. This differential resistance depends on the operating point of the diodes. It is high at low voltage and low at high voltage at the diodes. Consequently, a voltage-controlled voltage divider 14, 17, 19 is obtained.

It may also be expedient to connect further diodes in series to the first and second diodes 17, 19. This produces a greater variation of the differential resistance.

The first and second differential amplifiers 24, 28 balance each other about a reference voltage point which is formed at the tap 36 of the voltage divider consisting of the resistors 37, 38, 39. The symmetrical balancing about this reference voltage occurring at the tap 36 has the purpose of keeping the voltage average at the centre tap 9 of the voltage divider 14, 17, 19 approximately constant in order that the capacitor 12 does not have to have its charge reversed.

If only a low voltage is delivered by the inductive pickup 10, an attenuation is not necessary. The level detector 46, 37, 38 detects the low voltage and interrupts a further charging of the capacitor 33. Now the discharging resistor 35 connected to the tap 36 of the voltage divider 37, 38, 39 provides a discharge of the capacitor 33 to the reference potential at the tap 36. The two differential amplifiers 24 and 28 are consequently no longer balanced, as the respective non-inverting inputs 32 and 40 now likewise have the reference potential occurring at the tap 36.

The charging current of the capacitor 33 can be set by the current-limiting resistor 51 arranged between the output 52 of the amplifier 42 and the emitter terminal 50 of the transistor 46. By fixing the value of the current-limiting resistor 51 and the capacitance value of the capacitor 33, a time constant of the pulse shaper can be preset, by which it responds to level changes at the tap 9. As the capacitor 33 is subjected at most to the operating voltage of the pulse shaper, a small design can be chosen here, in particular a circuit integration is possible.

Connection at the output 52 of the amplifier 42 is the Schmitt trigger stage 44 including the differential amplyies 56 wired in a known way to the input resistor 43 and the positive feedback resistor 58. A hysteresis between a lower and an upper triggering treshold of this state can be set by the two resistors 43, 58. Then a voltage jump occurs at the output 57 each time the inductive pickup voltage rises above the lower triggering threshold and falls below the upper triggering threshold.

I claim:

1. Pulse shaper for inductive pickups, particularly speed pickups and rotational angle pickups at internal combustion engines, comprising a trigger stage for producing at its output a voltage jump each time a voltage at its input rises above a constant lower triggering threshold and falls below a constant upper triggering threshold; a voltage level adapting circuit arranged between an inductive pickup and the input of said trigger stage; said adapting circuit including a differential voltage divider having an ohmic resistor coupled to said inductive pickup and at least one voltage dependent resistance element controlled by a controllable voltage source whose voltage level is controlled by the inductive pickup voltage.

2. Pulse according to claim 1, wherein the tapping point of said voltage divider is coupled to an input of said Schmitt trigger stage.

3. Pulse shaper for inductive pickups, particularly speed pickups and rotational angle pickups at internal combustion engines, comprising a Schmitt trigger stage; a voltage level adapting circuit arranged between an inductive pickup and said Schmitt trigger stage; said adapting circuit including a voltage divider having an ohmic resistor coupled to said inductive pickup and at least one voltage dependent element controlled by a voltage source whose voltage level is controlled by the inductive pickup voltage; the tapping point of said voltage divider is coupled to an input of said Schmitt trigger stage; and said control voltage source including a balanced circuit of two amplifiers.

4. Pulse shaper according to claim 3, wherein said voltage divider includes a series connection of two diodes (17, 19) bridging the outputs of said amplifiers, and the common connection point of said diodes and said resistor forming said tapping point.

5. Pulse shaper according to claim 3, wherein said tapping point is coupled to the input of said Schmitt trigger via an additional amplifier (42).

6. Pulse shaper according to claim 5, wherein said adapting circuit further includes a control voltage integrator coupled to an input of one of said amplifiers in the balanced circuit, and a voltage level detector coupled between said integrator and the output of said additional amplifier (42).

7. Pulse shaper according to claim 6, wherein said integrator includes an integrating capacitor connected between said input of one of said amplifiers and ground, and a charging resistor (51) connected to the output of said additional amplifier (42).

8. Pulse shaper according to claim 7, wherein said voltage level detector includes a second voltage divider connected between a source of operating voltage (49) and ground, and a transistor (46) whose base is connected to a tapping point of said second voltage divider and whose collector-emitter path is connected between said integrator and said charging resistor (51).

9. Pulse shaper according to claim 8, wherein said integrator further includes a resistor (35) connected to another tapping point of said second voltage divider.

10. Pulse shaper according to claim 4, wherein said two amplifiers are differential amplifiers.

11. Pulse shaper according to claim 10, wherein one of said differential amplifiers is connected as an impedance converter having a shorted negative feedback connection.

12. Pulse shaper according to claim 1, wherein the other differential amplifier is connected as an inverting amplifier.

13. Pulse shaper according to claim 2, wherein said inverting amplifier has an amplification factor of 1 which is adjustable by a negative feedback resistor (29) and an input resistor connected between the inverting inputs of two differential amplifiers.

14. Pulse shaper according to claim 9, wherein said Schmitt trigger stage includes a differential amplifier having its inverting input connected to the output of said additional amplifier and its non-inverting input connected via a resistor to said other tapping point of said second voltage divider.

15. Pulse shaper according to claim 1, wherein said ohmic resistor is coupled to said pickup via a coupling capacitor.

16. Pulse shaper according to claim 15, wherein said pickup is grounded.

17. Pulse shaper according to claim 5, wherein said additional amplifer is a differential inverting amplifier.

* * * * *